(12) United States Patent  (10) Patent No.: US 7,485,806 B1
Gretz                    (45) Date of Patent:     Feb. 3, 2009

(54) ELECTRICAL CONNECTOR FOR FLEXIBLE CABLE

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 3 days.

(21) Appl. No.: 11/974,821

(22) Filed: Oct. 16, 2007

(51) Int. Cl.
    *H02G 3/18* (2006.01)
(52) U.S. Cl. .................... 174/59; 174/553; 174/655; 174/60; 174/135; 174/663; 439/604; 439/460; 248/56
(58) Field of Classification Search ............. 174/59, 174/653, 655, 659, 663, 135, 60; 439/604, 439/460, 583.584, 552, 463, 544, 559, 548; 248/56
    See application file for complete search history.

(56) References Cited

U.S. PATENT DOCUMENTS

| | | | |
|---|---|---|---|
| 3,127,471 A * | 3/1964 | Greiner | .............. 174/135 |
| 3,360,766 A * | 12/1967 | Schumacher | .............. 439/472 |
| 4,869,687 A | 9/1989 | Johnson | |
| 5,178,559 A * | 1/1993 | Mello | .............. 439/472 |
| 5,383,796 A | 1/1995 | Bowen et al. | |
| 5,553,787 A | 9/1996 | Guginsky | |
| 6,017,245 A | 1/2000 | Karir | |
| 6,140,582 A * | 10/2000 | Sheehan | .............. 174/669 |
| 7,126,064 B1 * | 10/2006 | Shemtov | .............. 174/662 |
| 7,223,122 B2 | 5/2007 | Mori | |
| 7,282,650 B2 * | 10/2007 | Czuhanich et al. | .......... 174/659 |

* cited by examiner

Primary Examiner—Dhiru R Patel

(57) ABSTRACT

An electrical connector for connecting flexible metal conduit, armored cable, or metal-clad cable to a panel or junction box. The connector includes a connector body having a tubular nose portion on the leading end and a clamping arrangement on the trailing end. The clamping arrangement includes a fixed clamp arm integral with the connector body and a movable clamp arm that is adjustable with respect to the fixed clamp arm. A tubular insert can be fitted into an inner bore on the tubular nose portion to provide the proper end stop for the cable and to properly insulate the inner bore from any electrical contact with the wire conductors of the electrical cable. The tubular nose portion is exteriorly threaded to accept a lock nut or resilient locking ring for securing the connector to a panel or junction box and for properly grounding the cable to the panel or box.

20 Claims, 9 Drawing Sheets

ELECTRICAL CONNECTOR FOR FLEXIBLE CABLE

FIELD OF THE INVENTION

This invention relates to connectors for attaching electrical cables to a panel or an electrical box.

BACKGROUND OF THE INVENTION

Electrical connectors for attaching an electrical cable to a panel, junction box, and the like are well known in the art. One such electrical connector, described in U.S. Pat. No. 5,553,787, comprises a connector body having a rectangular or square box configuration. The connector body comprises a top portion having a first tab portion disposed about the front edge of the top portion for connecting the electrical connector to an outlet box; a first side wall connected to the top portion; a second side wall also connected to the top portion; a bottom portion having a second tab portion disposed about the front edge of the bottom portion for connecting the electrical connector to the outlet box; and a rear end having a through-hole therein is connected to both the top and bottom portions; and a saddle and screw for concurrently securing the cable disposed within the connector body and securing the connector body to the outlet box.

Although the electrical connector described in U.S. Pat. No. 5,553,787 is capable of connecting an electrical cable to a junction box, it would not meet most local electrical codes for connection of high voltage metal-jacketed cable. Connectors for metal-jacketed cable must include an end stop for limiting the distance the cable is inserted, as the metal jacket must not advance past the panel or junction box wall. Only the wire conductors can be advanced past the panel wall into the electrical enclosure. Additionally, the portion of the connector that is beyond the stop is potentially exposed to the wire conductors and, according to the electrical code, must be insulated to prevent electrical shorts in case of damage occurring to the insulating jackets surrounding the wire conductors. The electrical connector of U.S. Pat. No. 5,553,787 clearly lacks a means of limiting the forward advance of a conventional metal-jacketed cable and further lacks an insulating surface at the forward end of the connector.

Therefore, electrical connectors of the prior art have not been fully optimized for connecting high voltage metal-jacketed cables to electrical panels, junction boxes, electrical distribution centers, and the like.

SUMMARY OF THE INVENTION

The invention is an electrical connector that is capable of connecting several types of electrical cables to a panel or junction box, including flexible metal conduit, armored cable, or metal-clad cable. The electrical connector can be easily configured in the field to handle several different sized electrical cables. The connector includes a connector body having a tubular nose portion on the leading end and a clamping arrangement on the trailing end. The clamping arrangement includes a fixed clamp arm integral with the connector body. A movable clamp arm is adjustable with respect to the fixed clamp arm. A tubular insert can be fitted into the inner bore of the tubular nose portion to provide the proper end stop for a specific size range of cable and to properly insulate the inner bore from any electrical contact with the wire conductors of the electrical cable. The tubular nose portion is exteriorly threaded to accept a lock nut or resilient locking ring for securing the connector to a panel or junction box and for properly grounding the cable to the panel or box.

OBJECTS AND ADVANTAGES

Several advantages are achieved with the electrical fitting of the present invention, including:
  (1) The electrical connector of the present invention is of simple construction, including a die-cast connector body, a movable clamp arm, an insulating insert that is typically molded of plastic, and fasteners for adjusting the movable clamp arm with respect to the fixed claim arm of the connector body.
  (2) The electrical connector of the present invention provides an end stop for positively preventing the electrical cable from advancing into the junction box or panel.
  (3) The insert provided is of continuous ring construction. Thus, all portions of the inner bore in the leading end of the connector body are protected from accidental electrical shorts from the wire conductors of the electrical cable.
  (4) The clamping arrangement includes four fasteners that provide even clamping pressure on the inserted electrical cable and superior strain relief.
  (5) A lateral tab is provided on the inner surface of both the movable and fixed clamp arms to engage grooves in the outer jacket of the inserted electrical cable and thereby provide better gripping force.

These and other objects and advantages of the present invention will be better understood by reading the following description along with reference to the drawings.

INDEX TO REFERENCE NUMERALS IN DRAWINGS

| | |
|---|---|
| 20 | electrical connector, first embodiment |
| 22 | connector body |
| 24 | leading end of connector body |
| 26 | trailing end of connector body |
| 28 | flange |
| 30 | tubular nose portion |
| 32 | cable clamping arrangement |
| 34 | tubular insert |
| 36 | central axis of connector body |
| 38 | inner bore |
| 40 | outer surface of nose portion |
| 42 | threads |
| 44 | outer surface of insert |
| 46 | inner cylindrical surface of nose portion |
| 48 | leading end of insert |
| 50 | trailing end of insert |
| 52 | rim |
| 54 | orienting arrangement |
| 56 | longitudinal groove of insert |
| 58 | raised rib of connector body |
| 60 | directional arrow |
| 62 | front opening of insert |
| 64 | bottom of connector body |
| 66 | cylindrical wall of insert |
| 68 | outer tubular body portion of insert |
| 70 | inner tubular body portion of insert |
| 72 | brace |
| 74 | fixed clamp arm |
| 76 | movable clamp arm |
| 78 | aperture in movable clamp arm |
| 80 | threaded bore in fixed clamp arm |
| 82 | threaded fastener |
| 84 | arcuate center portion of clamp arm |
| 86 | flat wing |
| 88 | convex arcuate surface of fixed clamp arm |
| 90 | convex arcuate surface of movable clamp arm |
| 92 | lateral tab |
| 94 | common wall portion of insert |
| 96 | inner cylindrical surface of nose portion |
| 100 | electrical connector, second embodiment |
| 102 | connector body |
| 104 | fixed clamp arm |
| 106 | movable clamp arm |
| 108 | tubular insert |
| 110 | reinforcing wall |
| 112 | outer edge of flat wing |
| 114 | flat wing |
| 116 | tubular nose portion |
| 118 | lateral tab |
| 120 | indentation |
| 122 | planar edge |
| 124 | rim of insert |
| 125 | flange of connector body |
| 126 | electrical cable |
| 128 | groove |
| 130 | knockout |
| 132 | panel |
| 133 | first attachment arrangement |
| 134 | locknut |
| 135 | second attachment arrangement |
| 136 | snap ring |
| 138 | directional arrow |
| 140 | directional arrow |
| 142 | tang |
| 144 | end of electrical cable |
| 146 | electrical conductor |
| D1 | distance rim extends from outer surface of insert |
| D2 | diameter of inner tubular body portion of insert |
| D3 | offset distance of the arcuate convex surface of the fixed clamp arm from the central axis of the connector body as compared to the inner cylindrical surface of the tubular nose portion |

DETAILED DESCRIPTION OF THE INVENTION

Figure 1:
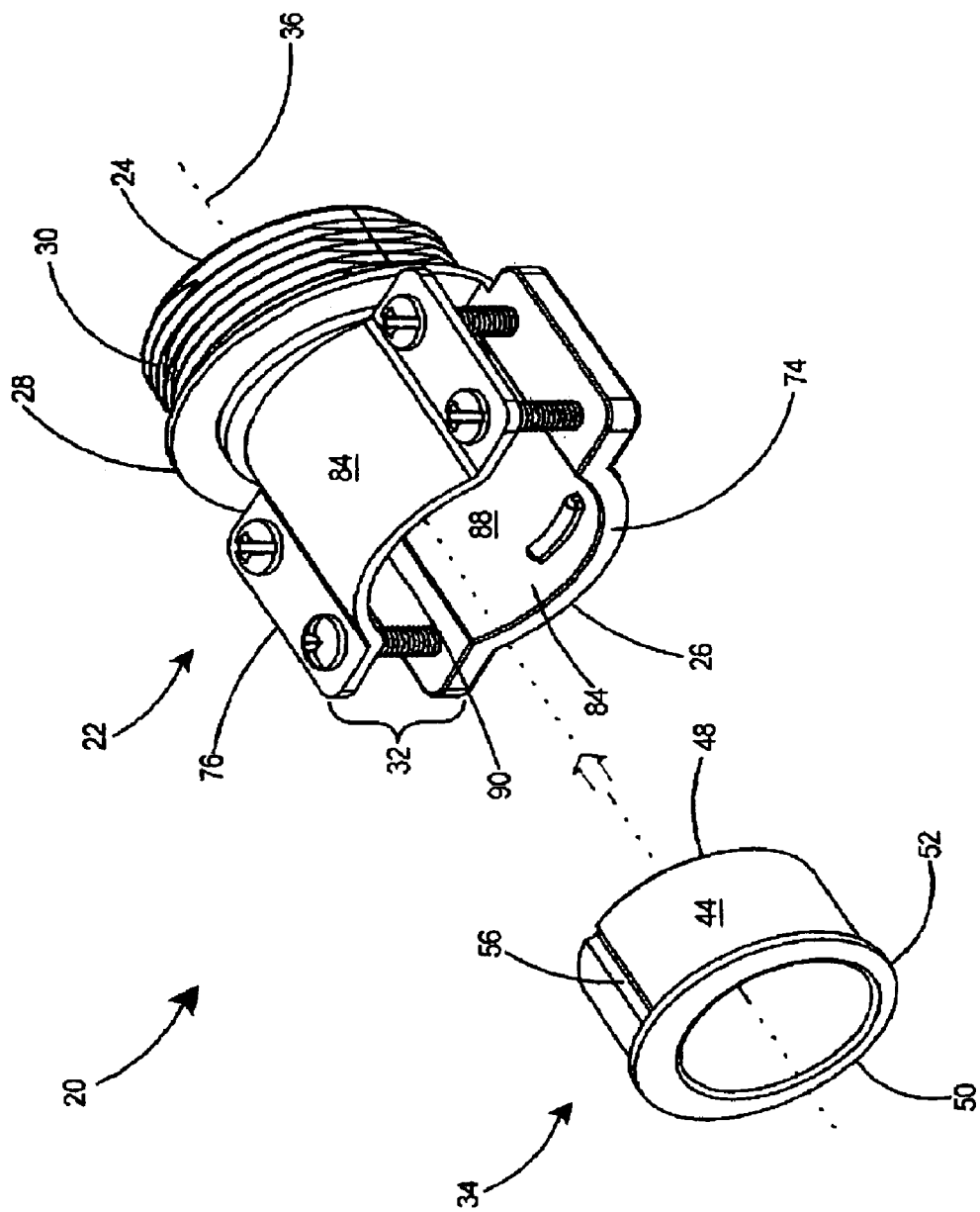
FIG. 1 is an exploded perspective view of a first embodiment of an electrical connector and insert according to the present invention as viewed from the trailing end.

With reference to FIG. 1 there is shown a first embodiment of the present invention, an electrical connector 20 including a connector body 22 having a leading end 24 and a trailing end 26 separated by a flange 28. A tubular nose portion 30 is provided on the leading end 24 and a cable clamping arrangement 32 on the trailing end 26. A tubular insert 34 is shown in axial alignment with the connector body 22 to be inserted therein.

Figure 2:
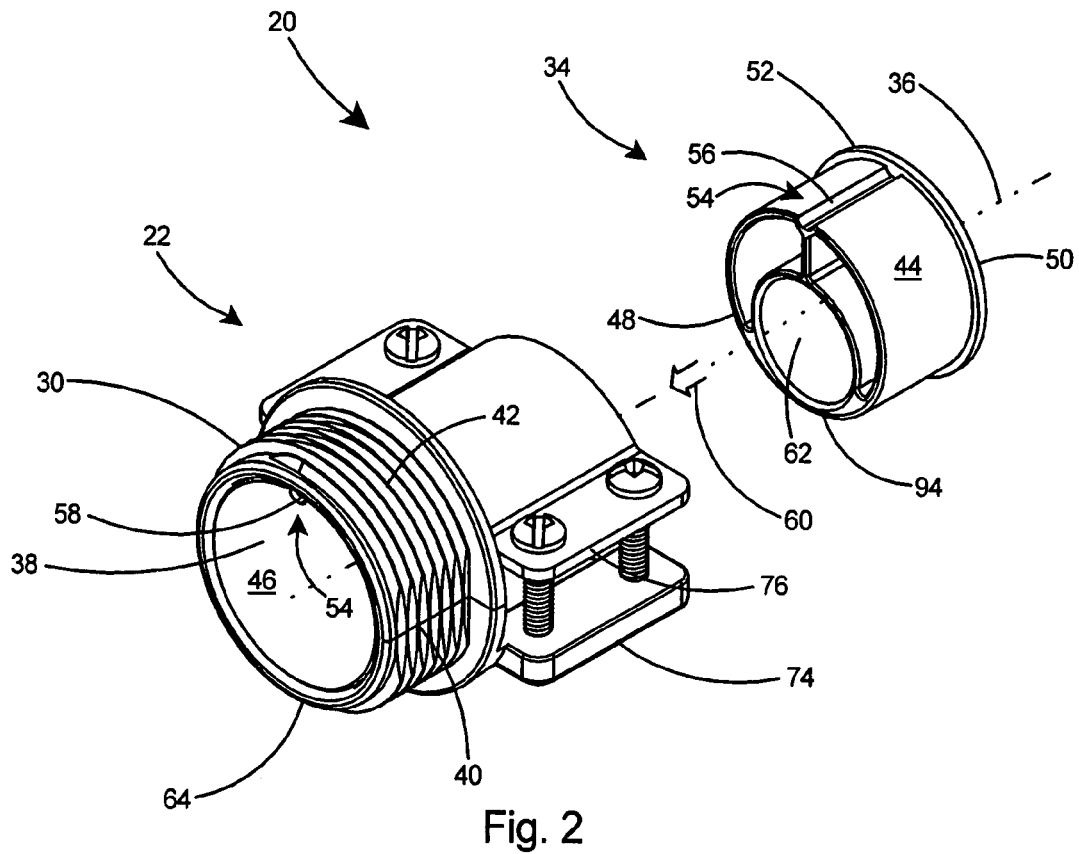
FIG. 2 is a perspective view of the electrical connector of FIG. 1 as viewed from the leading end.

Referring to FIG. 2, the connector body 22 includes a central axis 36 and an inner bore 38 therein. The tubular nose portion 30 of the electrical connector 20 includes an outer surface 40 and threads 42 thereon on the outer surface.

Figure 3:
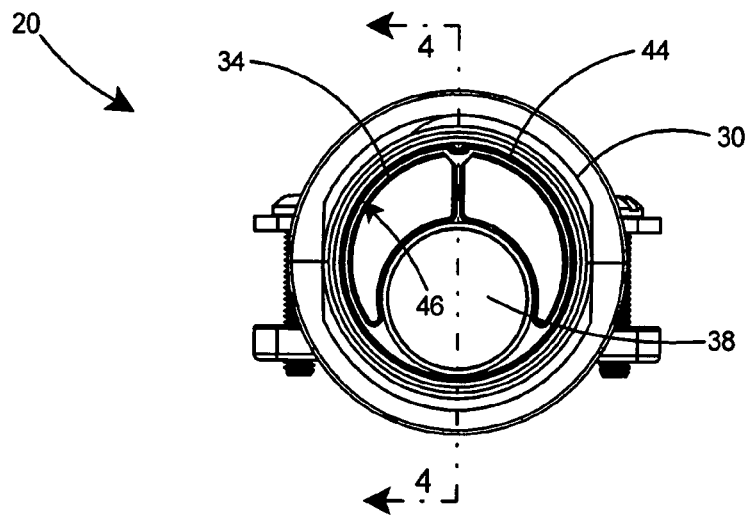
FIG. 3 is a front view of the electrical connector of FIG. 2.

As shown in FIG. 3, after being inserted in the inner bore 38 of the tubular nose portion 30, the outer surface 44 of the tubular insert 34 substantially extends to the inner cylindrical surface 46 of the tubular nose portion 30.

Figure 5:
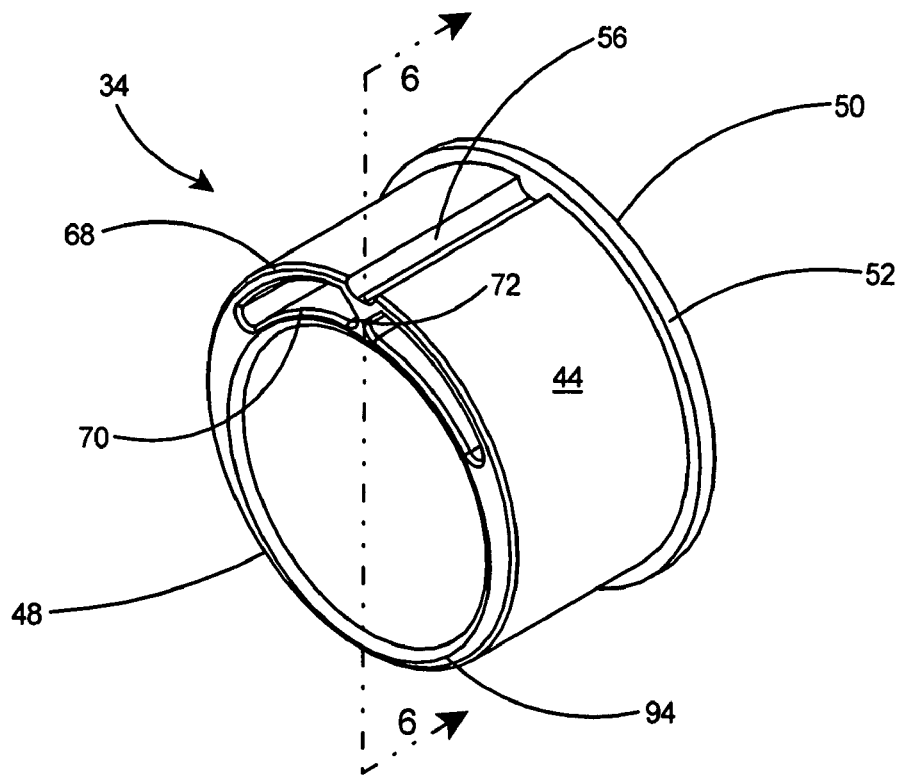
FIG. 5 is a front perspective view of a tubular insert that forms a portion of the electrical connector of FIG. 2.
Figure 6:
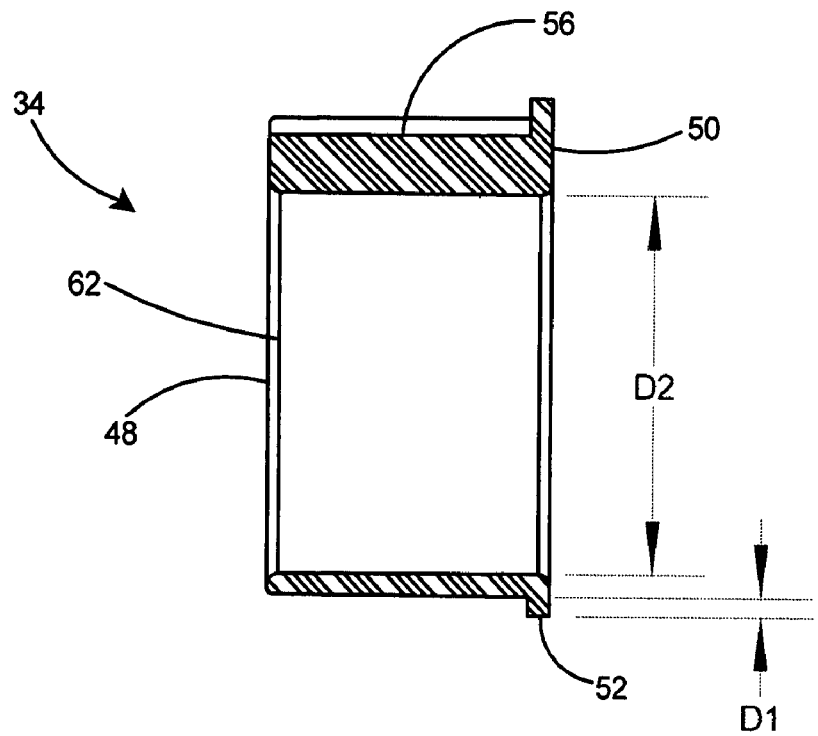
FIG. 6 is a sectional view of the tubular insert taken along line 6-6 of FIG. 5.
Figure 7:
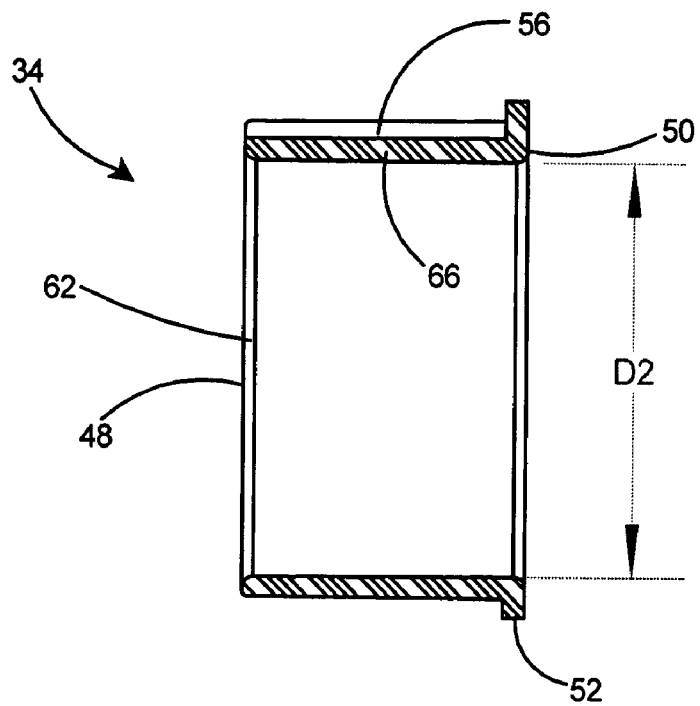
FIG. 7 is a sectional view similar to FIG. 6 of an alternate embodiment of a tubular insert according to the present invention.

With reference to FIGS. 5-7, the tubular insert 34 includes a leading end 48, a trailing end 50, and an outward extending rim 52 at the trailing end 50. As shown in FIG. 6, the rim 52 extends outward of the outer surface 44 by distance D1.

Referring to FIG. 2, the electrical connector 20 includes an orienting arrangement 54 for orienting the insert 34 with respect to the connector body 22. The orienting arrangement 54 includes a longitudinal groove 56 in the outer surface 44 of the insert 34 extending from the rim 52 to the leading end 48 and a raised rib 58 extending longitudinally thereon along the inner cylindrical surface 46 of the tubular nose portion 30. To join the insert 34 and connector body 22, the insert 34 must be oriented with the longitudinal groove 56 of the insert 34 in alignment with the raised rib 58 of the connector body 22. When the insert 34 is pressed into the connector body 22 in the direction of arrow 60, the raised rib 58 of the connector body 22 engages the longitudinal groove 56 of the insert 34 thereby aligning the front opening 62 of the insert 34 toward the bottom 64 of the connector body 22.

Figure 4:
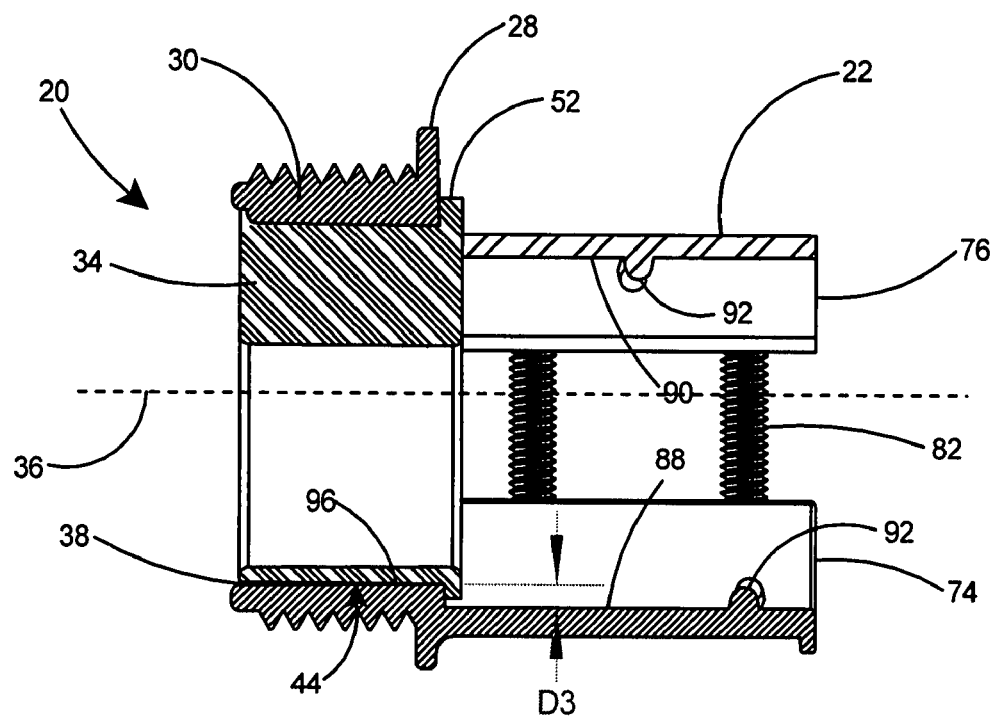
FIG. 4 is a sectional view of the electrical connector taken along line 4-4 of FIG. 3.

As shown in FIG. 4, the insert 34 is fully inserted in the tubular nose portion 30 of the connector body 22, when the rim 52 seats against flange 28. Preferably, the outer diameter of the insert 34 is very close to the inner diameter of the inner bore 38 of the nose portion 30 to cause a snug fit of the insert 34 within the nose portion 30. Preferably the difference between the diameter of the inner bore 38 and the outer diameter of the insert 34 is between 0.004 and 0.012 inch.

As shown in FIG. 6, the tubular insert 34 may be formed in various configurations to provide an inner diameter D2 to accommodate an electrical cable (not shown) of a specific size range. As shown in FIG. 7, the insert may include a solid cylindrical wall 66 or, as shown in FIG. 5, the tubular insert 34 may be constructed with an outer tubular body portion 68 and an inner tubular body portion 70. A brace 72 extends between the inner tubular body portion 68 and the outer tubular body portion 68 to brace and support the two portions of the insert 34. The inner tubular body portion 70 may be decreased in diameter to provide a smaller inner diameter to accommodate smaller diameter electrical cables. By providing inserts with various inner diameters, the electrical connector of the present invention has the advantage of accommodating a broad range of electrical cable sizes with a single size connector body. As shown in FIG. 4, the tubular insert 34 surrounds and covers the entire inner bore 38 of the nose portion 30 of the connector body 22, thereby preventing any electrical shorts from occurring from wire conductors (not shown) extending through the nose portion 30.

With reference to FIG. 1 the electrical connector includes a fixed clamp arm 74 integral with the flange 28 and tubular nose portion 30 of the connector body 22, a movable clamp arm 76 movable with respect to the fixed clamp arm 74, and a cable clamping arrangement 32 for adjusting the position of the movable clamp arm 76 with respect to the fixed clamp arm 74. The cable clamping arrangement 32 includes a plurality of apertures 78 in the movable clamp arm 76, a plurality of threaded bores 80 in the fixed clamp arm 74, and a plurality of threaded fasteners 82 for engagement through the apertures 78 of the movable clamp arm 76 into threaded engagement in the threaded bores 80 in the fixed clamp arm 74. The fixed and movable clamp arms 74, 76 further include an arcuate center portion 84 that is coaxial with the inner bore 38 of the tubular nose portion 30. Flat wings 86 extend laterally from the arcuate center portions 84 of the fixed and movable clamp arms 74, 76. The flat wings 86 of the fixed clamp arm 74 include the threaded bores 80 and the flat wings 86 of the movable clamp arm 76 include the apertures 78.

Referring to FIG. 1, the arcuate center portion 84 of the fixed clamp arm 74 includes a convex arcuate surface 88 and the arcuate center portion 84 of the movable clamp arm 76 includes a convex arcuate surface 90. The convex arcuate surface 90 of the movable clamp arm 76 and the convex arcuate surface 88 of the fixed clamp arm 74 face the central axis 36 of the connector body 22. As shown in FIG. 4, the convex arcuate surface 90 of the movable clamp arm 76 and the convex arcuate surface 88 of the fixed clamp arm 74 include a lateral tab 92 extending there from.

Referring to FIG. 5, the inner tubular body portion 70 of the insert 34 is offset axially from the outer tubular body portion 68. The inner tubular body portion 70 and the outer tubular body portion 68 share a common wall portion 94. As shown in FIG. 2, the orienting arrangement 54 orients the common wall portion 94 so that, after being inserted into the connector body 22, it will be adjacent the fixed clamp arm 74 or toward the bottom 64 of the connector body 22.

Referring to FIG. 4, the arcuate convex surface 88 of the fixed clamp arm 74 is offset farther from the central axis 36 of the connector body 22 as shown by distance D3, than is the inner cylindrical surface 96 of the tubular nose portion 30. This distance D3 is preferably no less than the width D1 of the rim 52 (see FIG. 6), which is equivalent to the distance the rim 52 extends from outer surface 44 of insert 34. The offset distance D3 provides clearance at the lower end of the flange 28 of the connector body 22 for the rim 52 of the tubular insert 34 to seat against flange 28 and around the entire periphery of the flange 28.

Figure 9:
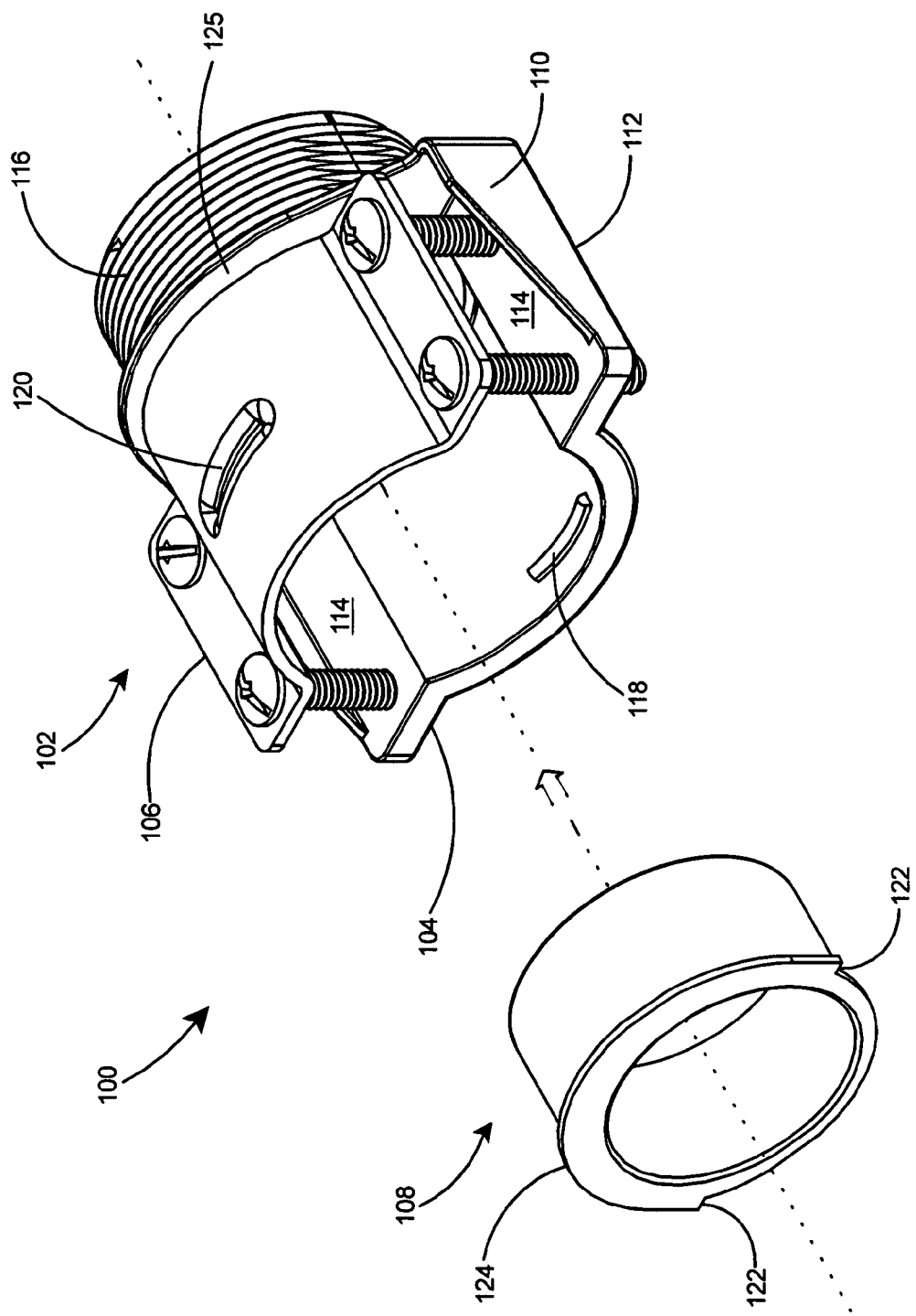
FIG. 9 is an exploded perspective view of a second and preferred embodiment of an electrical connector and insert according to the present invention as viewed from the trailing end.

Referring to FIG. 9 there is shown a second and preferred embodiment of an electrical connector 100 according to the present invention. The preferred embodiment of the electrical connector 100 includes a connector body 102, fixed clamp arm 104, movable clamp arm 106, and tubular insert 108 similar to the first embodiment. The connector body 102 includes a reinforcing wall 110 along the outer edges 112 of the flat wings 114. The reinforcing wall 110 stiffens the fixed clamp arm 104 and increases the strength and integrity of the tubular nose portion 116 and fixed clamp arm 104. The movable clamp arm 106 includes a lateral tab 118 (see FIG. 10) as in the first embodiment but the lateral tab 118 is formed by stamping it into the movable clamp arm 106 which, as shown in FIG. 9, forms the indentation 120 in the outer surface of the movable clamp arm 106. In the second embodiment shown in FIG. 9, the orienting arrangement of the first embodiment 20 including a longitudinal groove 56 in the tubular insert 34 and the raised rib 58 of the connector body 22 (see FIG. 2) have been replaced by planar edges 122 on the rim 124 of the tubular insert 108. As shown in FIG. 9, the planar edges 122 of the tubular insert 108 engage the flat wings 114 of the connector body 102 and guide the tubular insert 108 into the connector body 102 until the tubular insert 108 seats against the flange 125 of the connector body 102.

Figure 10:
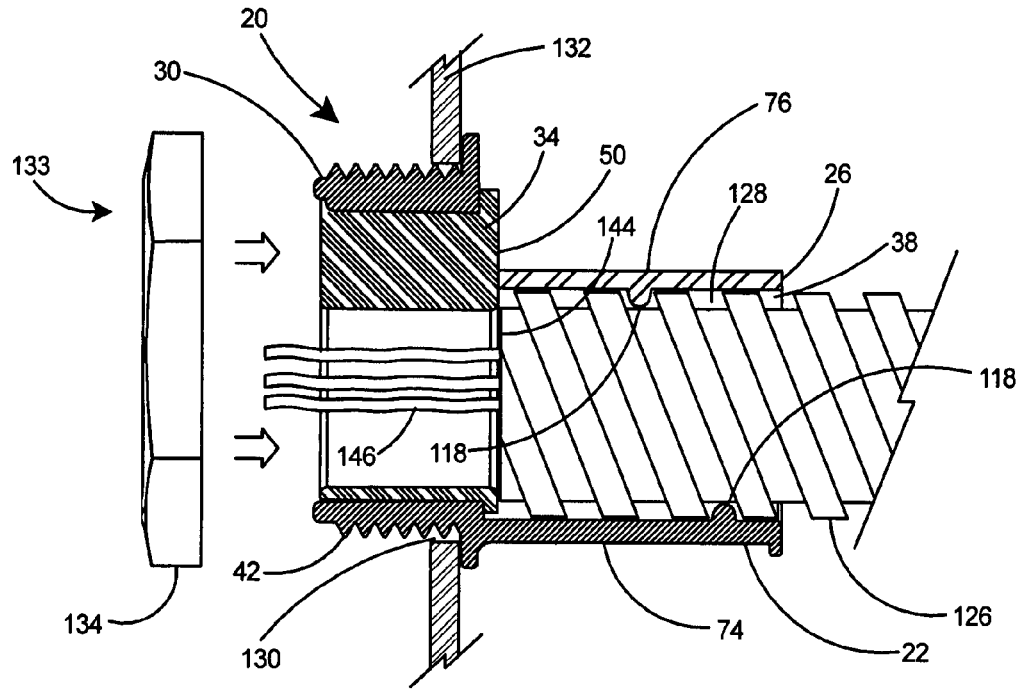
FIG. 10 is a sectional view of the electrical connector of FIG. 1 including a lock nut at the leading end for securing to an electrical panel.

With reference to FIG. 10, the electrical connector of the present invention 20 is operated by inserting an electrical cable 126 into the inner bore 38 on the trailing end 26 of the connector body 22. Lateral tabs 92 on the fixed clamp arm 74 and movable clamp arm 76 engage a groove 128 in the electrical cable 126. The tubular nose portion 30 is then inserted through a knockout 130 in a panel 132 as shown.

Figure 11:
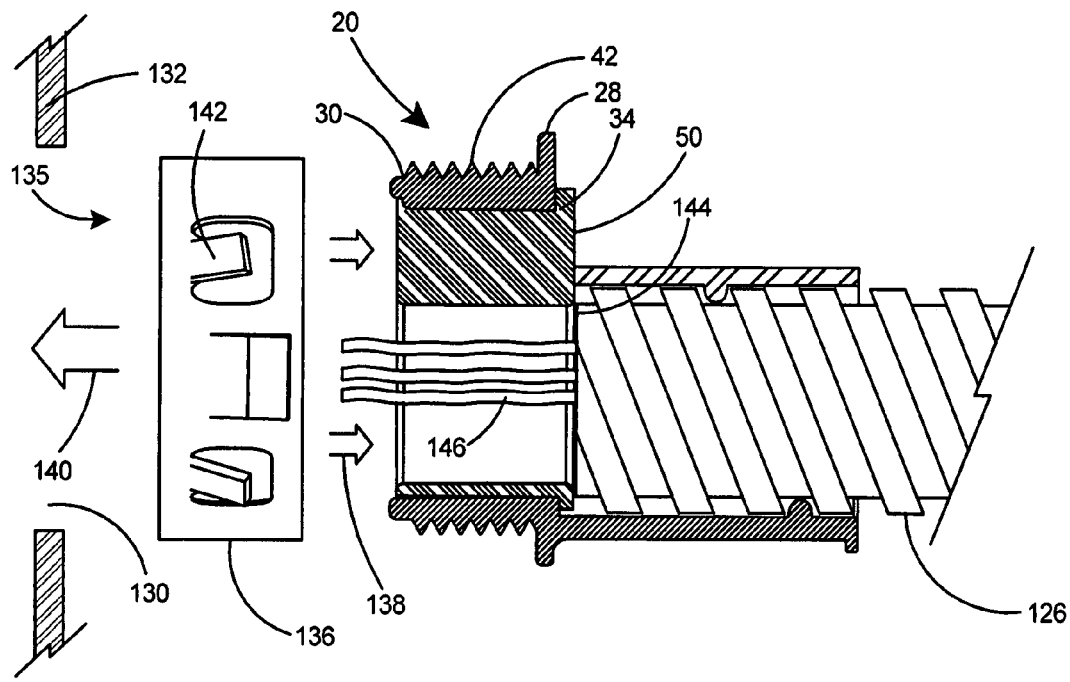
FIG. 11 is a sectional view of the electrical connector of FIG. 1 including a snap ring at the leading end for securing the connector to an electrical panel.

FIGS. 10 and 11 illustrate two attachment arrangements for locking the electrical connector 20 to a panel 132. In FIG. 10, a first attachment arrangement 133 includes a locknut 134 that is screwed onto the threads 42 of the nose portion 30 until the locknut 134 tightens the connector body 22 to the panel 132. In FIG. 11, a second attachment arrangement 135 includes a resilient annular-shaped snap ring 136 that is first screwed onto the threads 42 on the nose portion 30 in the direction of arrows 138 until the snap ring 136 is tight against the flange 28. A suitable snap ring for use with the electrical connector of the present invention is shown and described in U.S. Pat. No. 6,538,201, which is incorporated herein in its entirety by reference thereto, and which snap ring is available from Arlington Industries, Inc., of Scranton, Pa. The cable connector 20 and snap ring 136 assembly is then pushed in the direction of arrow 140 through the knockout 130 until the tangs 142 lock against the panel 132 and snap outward to hold the electrical connector 20 securely within the panel.

As shown in both FIGS. 10 and 11, the electrical cable 126 is inserted into the electrical connector 20 until its end 144 contacts the trailing end 50 of tubular insert 34. The tubular insert 34 protects any electrical conductors 146 that are fed through the nose portion 30 of the electrical connector 20.

Figure 12:
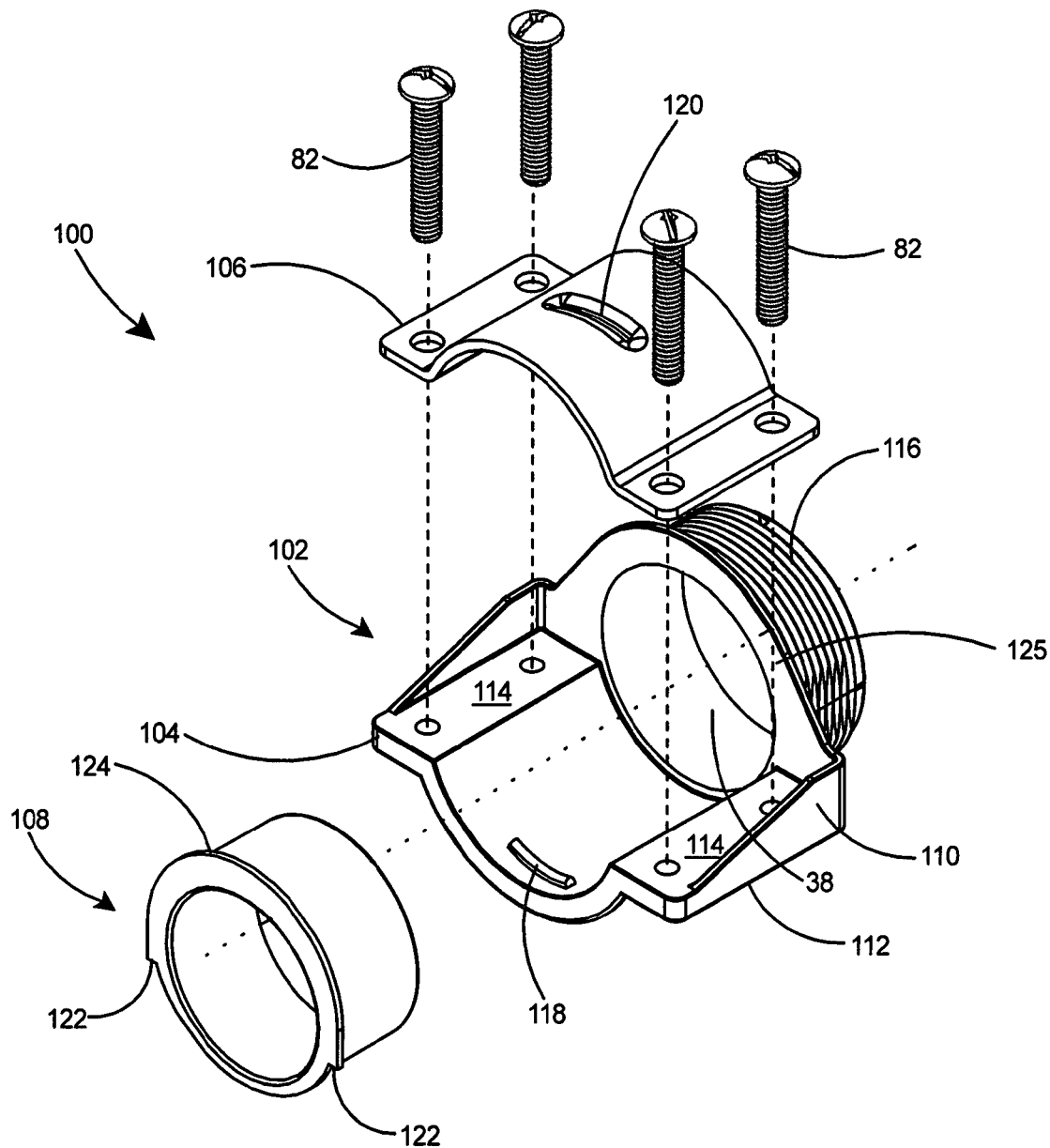
FIG. 12 is an exploded perspective view of the electrical connector of FIG. 9.

With reference to FIG. 12 there is shown the second embodiment of the electrical connector 100 with the tubular insert 108, movable clamp arm 106, and fasteners 82 exploded away from the connector body 102. The planar edges 122 on the tubular insert 108 engage the flat wings 114 on either side of the fixed clamp arm 104 and will guide the tubular insert 108 into the connector body 102 until it enters inner bore 38 and seats against flange 125.

Figure 13:
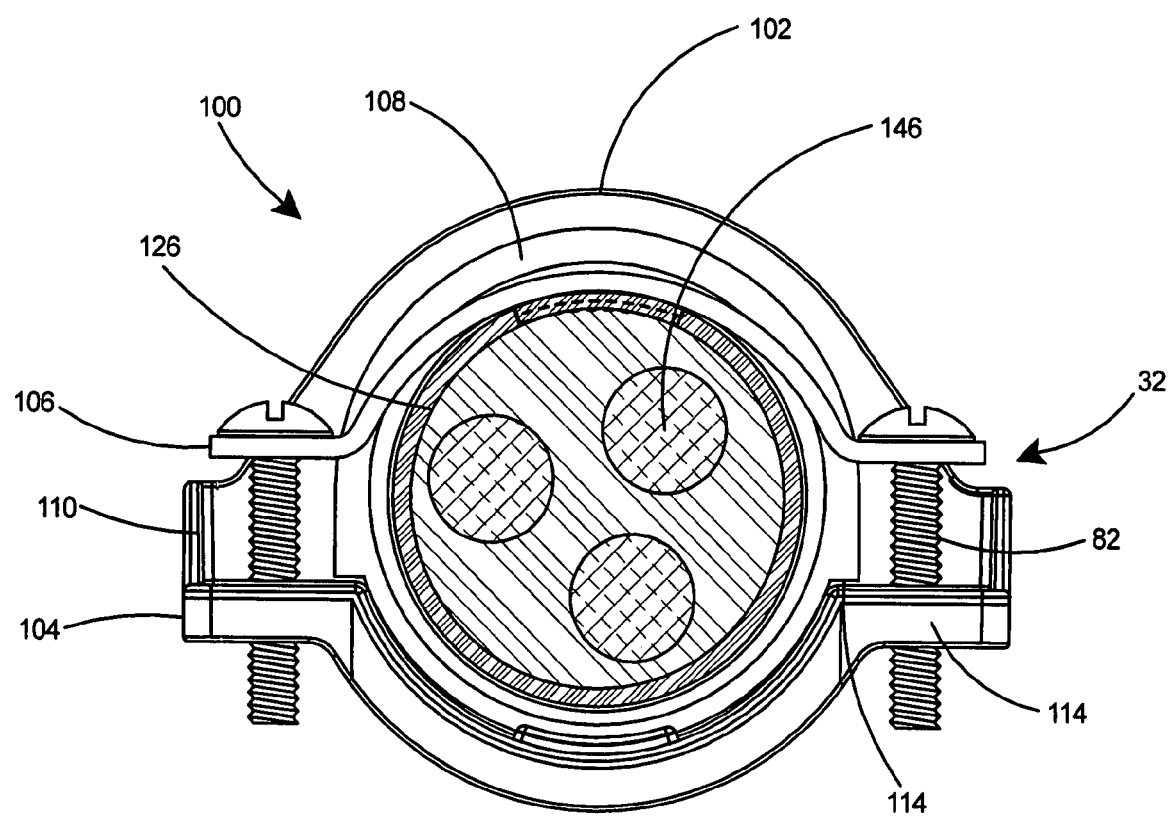
FIG. 13 is a view of the trailing end of the electrical connector of FIG. 9 depicting an electrical cable inserted and locked therein.

With reference to FIG. 13 there is shown a view from the trailing end of an electrical connector 100 according to the present invention after an electrical cable 126 has been inserted therein. The electrical cable 126 is held securely within the electrical connector 100 by the cable clamping arrangement 32 including the movable clamp arm 106 that has been tightened against fixed clamp arm 104 by threaded fasteners 82.

Figure 8:
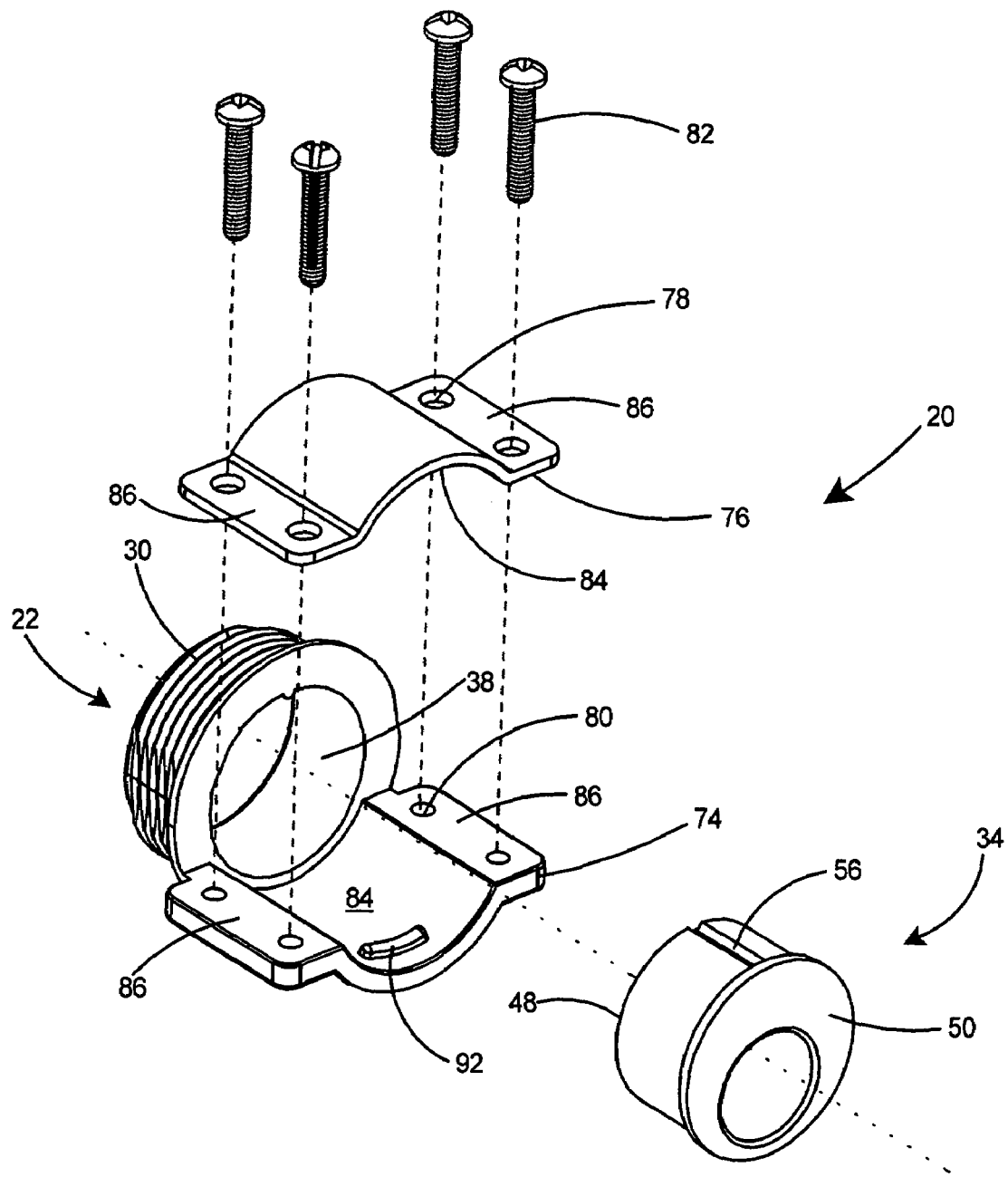
FIG. 8 is an exploded perspective view of the electrical connector of FIG. 1 including three alternative embodiments of tubular insert.

With reference to FIG. 8, the connector body 22 and the movable clamp arm 76 of the present invention are preferably constructed of metal. The connector body 22 is preferably die cast of metal and the preferred material of construction is zinc alloy such as ZAMAK™, available from New Jersey Zinc Company of Newark, N.J. The movable clamp arm 76 of the present invention is preferably stamped and formed from metal and the preferred material of construction is galvanized low carbon steel. The tubular insert 34 is preferably molded of plastic. Preferable molding plastics for constructing the tubular insert 34 include polypropylene and nylon.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical connector for connecting an electrical cable having an outer sheath and one or more electrical conductors to a panel comprising:
   a connector body including a leading end and a trailing end separated by a flange;
   said leading end including a tubular nose portion having an inner bore;
   said trailing end including a cable clamp extending from said flange;
   said cable clamp including a fixed clamp arm integral with said tubular nose portion, a movable clamp arm movable with respect to said fixed clamp arm, and a cable clamping arrangement for adjusting the position of said movable clamp arm with respect to said fixed clamp arm;
   said cable clamping arrangement including a plurality of apertures in said movable clamp arm, and a plurality of threaded bores in said fixed clamp arm, and a plurality of threaded fasteners for engagement through said apertures in said movable clamp into threaded engagement in said threaded bores in said fixed clamp arm;
   a tubular insert seated in said inner bore of said tubular nose portion; said tubular insert including a leading end and a trailing end; and
   said tubular insert covering the entirety of said inner bore of said tubular nose portion,
   whereby the electrical cable is inserted into said trailing end of said connector body until engaging said trailing end of said tubular insert, said cable clamping arrangement is tightened to secure the electrical cable to said trailing end of said connector body, and said tubular insert provides electrical insulation between the electrical conductors and said inner bore of said tubular nose portion of said connector body.

2. The electrical connector of claim 1 wherein said fixed and movable clamp arms include
   an arcuate center portion, said arcuate center portion coaxial with said inner bore of said tubular nose portion; and
   flat wings extending laterally from said arcuate center portion.

3. The electrical connector of claim 2 wherein
   said connector body includes a central axis:
   said flat wings of said fixed clamp arm include said threaded bores; and
   said flat wings of said movable clamp arm include said apertures.

4. The electrical connector of claim 3 wherein
   said arcuate center portion of said fixed clamp arm includes a convex arcuate surface;
   said arcuate center portion of said movable clamp arm includes a convex arcuate surface; and
   said convex arcuate surface of said movable clamp arm and said convex arcuate surface of said fixed clamp arm face said central axis of said connector body.

5. The electrical connector of claim 4 wherein said convex arcuate surface of said movable clamp arm and said convex arcuate surface of said fixed clamp arm facing said central axis of said connector body include a lateral tab extending there from.

6. The electrical connector of claim 1 wherein
   said tubular nose portion includes an outer surface; and
   said outer surface of said tubular nose portion includes threads thereon.

7. The electrical connector of claim 1 wherein said tubular insert includes
   an outer surface; and
   an outward extending rim at said trailing end of said tubular insert, said rim extending outward of said outer surface by the width of said rim.

8. The electrical connector of claim 7 wherein said insert is inserted in said inner bore of said tubular nose portion with said rim contacting said flange of said connector body.

9. The electrical connector of claim 8 wherein
   said tubular nose portion includes an inner cylindrical surface; and
   said arcuate convex surface of said fixed clamp arm is offset farther from said central axis of said connector body than is said inner cylindrical surface of said tubular nose portion by at least the width of said rim.

10. The electrical connector of claim 9 including an orienting arrangement for orienting said insert with respect to said connector body.

11. The electrical connector of claim 10 wherein said orienting arrangement includes
    a longitudinal groove therein in said outer surface of said insert extending from said rim to said leading end.
    a raised rib extending longitudinally thereon along the inner cylindrical surface of said tubular nose portion.

12. The electrical connector of claim 11 wherein said insert is inserted into said inner bore of said tubular nose portion by engaging said rib within said groove.

13. The electrical connector of claim 12 including
    an outer edge on said wings of said fixed clamp arm; and
    a wall extending laterally from said flange and along said outer edges of said wings.

14. The electrical connector of claim 11 wherein said tubular insert includes
    an outer tubular body portion;
    an inner tubular body portion; and
    a rib extending between said inner tubular body portion and said outer tubular body portion.

15. The electrical connector of claim 14 wherein
    said inner tubular body portion is offset axially from said outer tubular body portion; and
    said inner tubular body portion and said outer tubular body portion share a common wall portion; and
    said common wall portion is oriented by said orienting arrangement such that said common wall portion is adjacent said fixed clamp arm of said connector body.

16. The electrical connector of claim 1 wherein said connector body and said movable clamp arm are constructed of metal.

17. The electrical connector of claim 1 wherein said insert is constructed of plastic.

18. The electrical connector of claim 1 wherein said plastic is selected from the group including polypropylene and nylon.

19. The electrical connector of claim 1 including
    an attachment arrangement for securing said leading end of said connector body to the panel; and
    said attachment arrangement including threads on said nose portion of said connector body and a lock nut for engaging said threads on said nose portion.

20. The electrical connector of claim 1 including
    an attachment arrangement for securing said leading end of said connector body to the panel; and
    said attachment arrangement including threads on said nose portion of said connector body and a snap fitting for engaging said threads on said nose portion.

* * * * *